US009255699B2

(12) United States Patent
Wiegel et al.

(10) Patent No.: US 9,255,699 B2
(45) Date of Patent: Feb. 9, 2016

(54) MOTION SENSING DOCK LIGHTING SYSTEMS

(71) Applicants: Aaron J. Wiegel, Benton, WI (US); Jason Dondlinger, Bellevue, IA (US); Joe Korman, Dubuque, IA (US); Lucas I. Paruch, Dubuque, IA (US); Ronald P. Snyder, Dubuque, IA (US); Andy Olson, Milwaukee, WI (US); Charles Waugaman, Mequon, WI (US); Matthew McNeill, Whitefish Bay, WI (US)

(72) Inventors: Aaron J. Wiegel, Benton, WI (US); Jason Dondlinger, Bellevue, IA (US); Joe Korman, Dubuque, IA (US); Lucas I. Paruch, Dubuque, IA (US); Ronald P. Snyder, Dubuque, IA (US); Andy Olson, Milwaukee, WI (US); Charles Waugaman, Mequon, WI (US); Matthew McNeill, Whitefish Bay, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 369 days.

(21) Appl. No.: 13/762,916

(22) Filed: Feb. 8, 2013

(65) Prior Publication Data

US 2014/0225509 A1    Aug. 14, 2014

(51) Int. Cl.
*H01K 7/00* (2006.01)
*F21V 21/26* (2006.01)
*B65G 69/28* (2006.01)
*H05B 37/02* (2006.01)

(52) U.S. Cl.
CPC ............ *F21V 21/26* (2013.01); *B65G 69/2882* (2013.01); *H05B 37/0227* (2013.01)

(58) Field of Classification Search
CPC ..... B65G 69/2882; F21V 21/26; F21V 21/28; F21V 21/29
USPC ....................... 315/76, 77, 129, 133
See application file for complete search history.

(56) References Cited

U.S. PATENT DOCUMENTS

| | | |
|---|---|---|
| 2,538,655 A | 1/1951 | Preston |
| 3,275,878 A | 9/1966 | Wilbanks |

(Continued)

FOREIGN PATENT DOCUMENTS

| | | |
|---|---|---|
| GB | 983013 | 2/1965 |
| GR | 1003642 B1 | 8/2001 |

(Continued)

OTHER PUBLICATIONS

State Intellectual Property Office of the People's Republic of China, "Certificate of Design Patent", issued in connection with Chinese patent application No. 201330377448.1, 3 pages.

(Continued)

*Primary Examiner* — William Hernandez
(74) *Attorney, Agent, or Firm* — Hanley, Flight and Zimmerman, LLC (57) ABSTRACT

Motion sensing dock lighting systems are disclosed. An example lighting system for use at a loading dock where a material handling device is used to load or unload a vehicle parked at the loading dock includes a motion sensing system to be spaced apart from the material handling device. The motion sensing system is to provide an operation signal in response to the material handling device undergoing a change in travel direction within the vehicle. The example lighting system also includes a lamp to be operatively connected in signal communication with the motion sensing system so as to receive the operation signal from the motion sensing system. The lamp is to have a first illuminating mode and a second illuminating mode, and the lamp is to switch between the first illuminating mode and the second illuminating mode in response to the operation signal.

22 Claims, 9 Drawing Sheets

(56) References Cited

U.S. PATENT DOCUMENTS

| | | | |
|---|---|---|---|
| D296,369 S | 6/1988 | Harvey | |
| 4,973,016 A | 11/1990 | Hertenstein | |
| D327,131 S | 6/1992 | Vrancart et al. | |
| 5,171,086 A | 12/1992 | Baloochi | |
| 5,709,458 A | 1/1998 | Metz | |
| D542,943 S | 5/2007 | Wang | |
| D546,980 S | 7/2007 | Lo | |
| D549,854 S | 8/2007 | Takahashi | |
| D566,300 S | 4/2008 | Lo | |
| D582,578 S | 12/2008 | Tsai et al. | |
| D593,223 S | 5/2009 | Komar | |
| D599,931 S | 9/2009 | van Klinken | |
| D647,646 S | 10/2011 | Tsung | |
| D664,272 S | 7/2012 | Lee | |
| D683,883 S | 6/2013 | Yorio et al. | |
| D693,947 S | 11/2013 | Wiegel et al. | |
| D701,640 S | 3/2014 | Wiegel et al. | |
| D702,397 S | 4/2014 | Wiegel et al. | |
| 2003/0067767 A1 | 4/2003 | Liu | |
| 2004/0114921 A1* | 6/2004 | Braun et al. | 396/661 |
| 2005/0168999 A1 | 8/2005 | Sommers et al. | |
| 2005/0260943 A1 | 11/2005 | Snyder et al. | |
| 2008/0010757 A1* | 1/2008 | Hochstein et al. | 14/69.5 |
| 2010/0146719 A1 | 6/2010 | Swessel et al. | |
| 2010/0201267 A1* | 8/2010 | Bourquin et al. | 315/32 |
| 2010/0240418 A1* | 9/2010 | Matoba | 455/566 |
| 2010/0301773 A1 | 12/2010 | Chemel et al. | |
| 2011/0001957 A1* | 1/2011 | Braune et al. | 356/4.01 |
| 2011/0203059 A1 | 8/2011 | Whitley et al. | |
| 2011/0304840 A1* | 12/2011 | Hsu et al. | 356/4.03 |

FOREIGN PATENT DOCUMENTS

| | | |
|---|---|---|
| WO | 2009003279 | 1/2009 |
| WO | 2014123733 | 8/2014 |

OTHER PUBLICATIONS

International Searching Authority, "Invitation to Pay Additional Fees and Partial Search Report," issued in connection with PCT application No. PCT/US2014/013494, mailed on May 27, 2014, 5 pages.

International Searching Authority, "Search Report", issued in connection with PCT patent application No. PCT/US2014/013494, mailed on Jul. 23, 2014, 7 pages.

International Searching Authority, "Written Opinon", issued in connection with PCT patent application No. PCT/US2014/013494, mailed on Jul. 23, 2014, 4 pages.

The United States Patent and Trademark Office, "Notice of Allowance," issued in connection with U.S. Appl. No. 29/445,240, dated Jul. 12, 2013, 12 pages.

The United States Patent and Trademark Office, "Notice of Allowance," issued in connection with U.S. Appl. No. 29/445,241, dated Nov. 22, 2013, 22 pages.

The United States Patent and Trademark Office, "Notice of Allowance," issued in connection with U.S. Appl. No. 29/451,957, dated Dec. 18, 2013, 25 pages.

International Bureau, "International Preliminary Report on Patentability", issued in connection with PCT patent application No. PCT/US2014/013494, Aug. 11, 2015, 6 pages.

European Patent Office, "Communication pursuant to Rules 161(1) and 162 EPC", issued in connection with European patent application No. 14706995.9, Oct. 15, 2015, 2 pages.

* cited by examiner

- 94 — Projecting a light output from a lamp
- 96 — sensing a body moving relative to the lamp
- 98 — determining whether the body is moving closer to or farther away from the lamp
- 100 — adjusting the light output

FIG. 11

- 106 — material handling device entering the vehicle
- 108 — sensing the material handling device moving in a forward direction
- 110 — sensing the material handling device moving in a reverse direction
- 112 — lamp projecting more light in a primary direction when the material handling device is moving in the forward direction farther into the vehicle than when the material handling device is moving in the reverse direction

MOTION SENSING DOCK LIGHTING SYSTEMS

FIELD OF THE DISCLOSURE

This patent generally pertains to lighting systems and more specifically to motion sensing dock lighting systems.

BACKGROUND

Some loading docks of a building include an exterior doorway with an elevated platform for loading and unloading vehicles, such as trucks and trailers. To compensate for height differences between the loading dock platform and an adjacent bed of a truck or trailer, many loading docks have a dock leveler. Some dock levelers include a deck or ramp that is pivotally hinged along its back edge to vary the height of its front edge. An extension plate or lip extends outward from the deck's front edge to span the gap and thus create a bridge between the rear of the truck bed and the front edge of the deck. This allows personnel and material handling equipment to readily move on and off the vehicle during loading and unloading operations.

If the truck or trailer is enclosed, as opposed to being an open flat bed trailer, the inside of the trailer can be quite dark, making it difficult to see deep inside the trailer. So, a light fixture pointing into the trailer can be installed and used near the doorway of building. Such light fixtures are available in various shapes and sizes.

DETAILED DESCRIPTION

An example lighting system 10 and associated methods, shown in FIGS. 1-11, comprises a lamp 12 for illuminating the interior of a vehicle 14 (e.g., a truck or trailer) parked at a loading dock 16 of a building 18. In the illustrated example, the lamp 12 is installed somewhere in relation to a doorway 20 and a dock leveler 22 that provides access between the vehicle 14 and the interior of the building 18. To prevent the lamp 12 from projecting excessively bright light directly into the eyes of, for example, a person driving a forklift within the vehicle 14 toward the lamp 12, the lighting system 10 includes a motion sensing system 24 for determining whether a body 26 (e.g., a material handling device 28, person, etc.) is traveling farther into or out of the vehicle 14 and for providing an operation signal 30 indicating the body's travel direction. The lamp 12 is operatively connected in signal communication with the motion sensing system 24 so as to receive the operation signal 30 from the motion sensing system 24 and to dim or redirect the lamp's light output 32 when the body 26 is traveling toward the lamp 12

In some examples, the motion sensing system 24 is any component or system of components that detects the presence of a moving body or object that is spaced apart from the motion sensing system itself. Examples of the motion sensing system 24 include, but are not limited to, a video camera with analytics, a microphone with analytics, one or more photoelectric eyes, an ultrasonic sensor, a microwave sensor, a passive infrared sensor, a radar, etc.

In response to the operation signal 30 indicating that the body 26 has undergone a change in travel direction, a controller 34 automatically switches the lamp 12 between a first illuminating mode and a second illuminating mode. In the first illuminating mode, illustrated in FIGS. 1 and 3, lamp projects more light (e.g., the light output 32a and 32c) toward the body 26 when the body 26 is traveling in a forward direction 36 farther into the vehicle 14. In the second illuminating mode, illustrated in FIGS. 2 and 4, the lamp 12 projects less light (e.g., the light output 32b and 32d) toward the body 26 when the body 26 is traveling in a reverse direction 38 toward the lamp 12.

Figure 1:
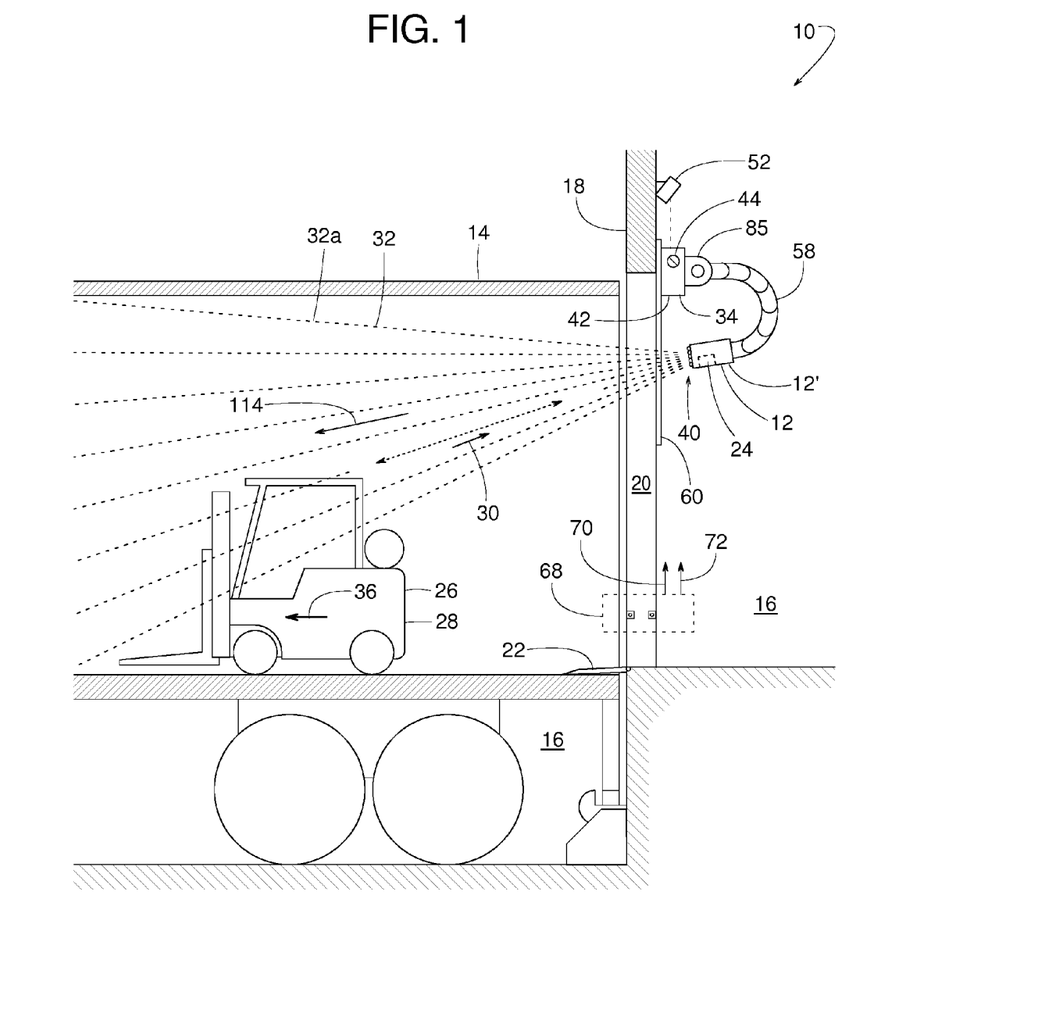
FIG. 1 is a cross-sectional side view of an example vehicle illuminated by an example lighting system constructed according to the teachings disclosed herein.
Figure 2:
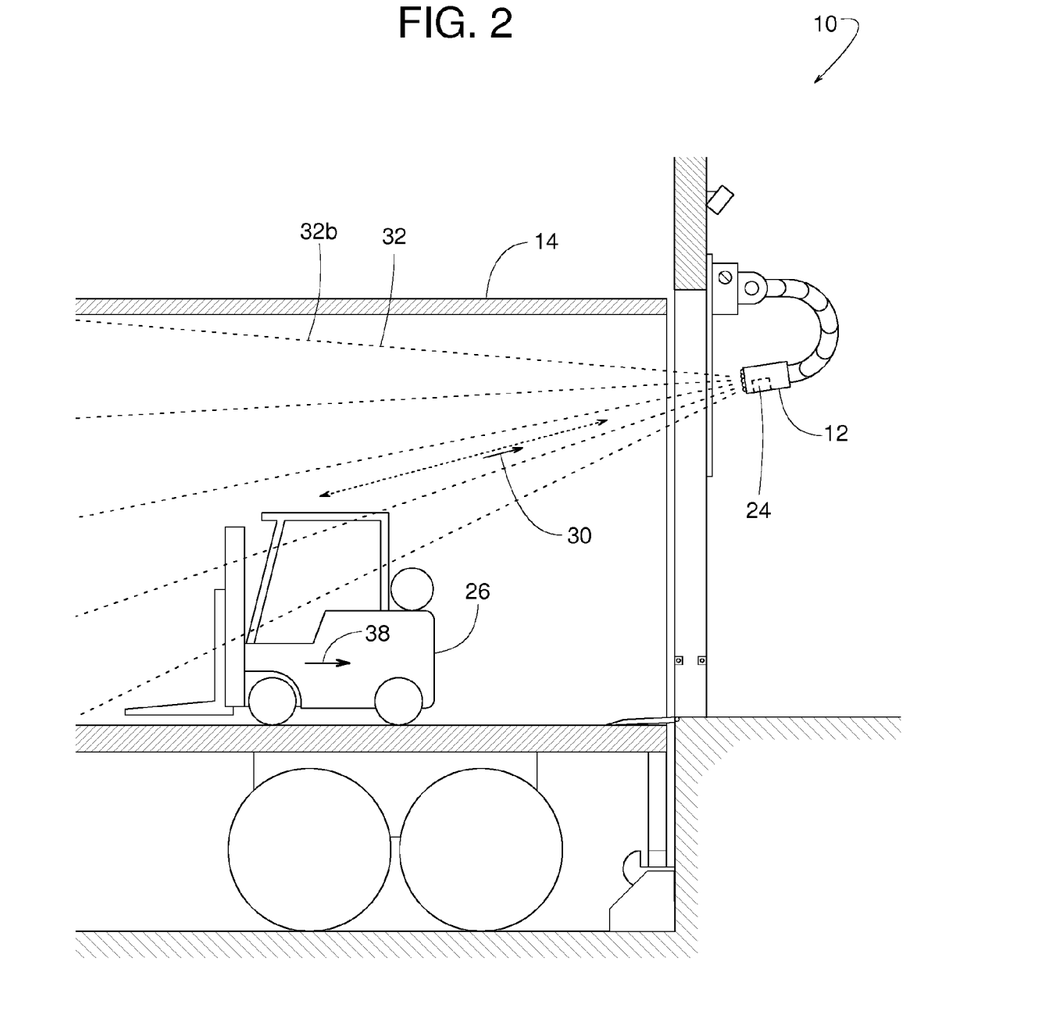
FIG. 2 is a cross-sectional side view similar to FIG. 1 but showing the example lighting system projecting less light.

In the example shown in FIGS. 1 and 2, the lamp 12 projects more lumens in the first illuminating mode (FIG. 1) than in the second illuminating mode (FIG. 2). In some examples, this is accomplished by providing the lamp 12 with a plurality of light-emitting elements 40 (e.g., light emitting diodes, LEDs, incandescent bulbs, fluorescent bulbs, etc.) and energizing more of them during the first illuminating mode than during the second illuminating mode. In addition or alternatively, more electrical power is delivered to one or more light-emitting elements 40 during the first illuminating mode than during the second illuminating mode.

The specific details and component layout of the controller 34, the lamp 12 and the motion sensing system 24 may vary. In some examples, the motion sensing system 24 comprises a Colibri universal motion sensor for automatic doors. Colibri motion sensors are provided by BEA sa (a HALMA company) of Angleur, Belgium. In some examples, the lamp 12 comprises an array of six LEDs and optics (Cree XTE) provided by Cree of Durham, N.C. The controller 34 may be implemented by a digital or analog electrical circuit, logic circuit and/or microprocessor with appropriate inputs and outputs for controlling the lamp 12 in response to input from motion sensing system 24. In some examples, at least part of the controller 34 is physically incorporated within the lamp 12. In some examples, at least part of the controller 34 is housed within a mounting base 42 of the lamp 12. In some examples, at least part of the controller 34 is contained within a separate housing and is hardwired or connected in wireless communication with the lamp 12 and the motion sensing system 24. In some examples, the light-emitting elements 40 and the motion sensing system 24 are physically incorporated within the lamp 12 and share a common housing 12'.

In some examples, the lighting system's controller 34 includes a user adjustment input 44 to facilitate changing the brightness of the first and second illuminating modes. In some examples, the user adjustment input 44 enables a user to vary the lamp's delta brightness between the first and second illuminating modes (e.g., correspondingly increasing or decreasing the brightness of the first and second modes by a common amount). Examples of user adjustment 44 include, but are not limited to, a potentiometer, a knob, a dial, a switch, a touchscreen and a pushbutton.

Figure 3:
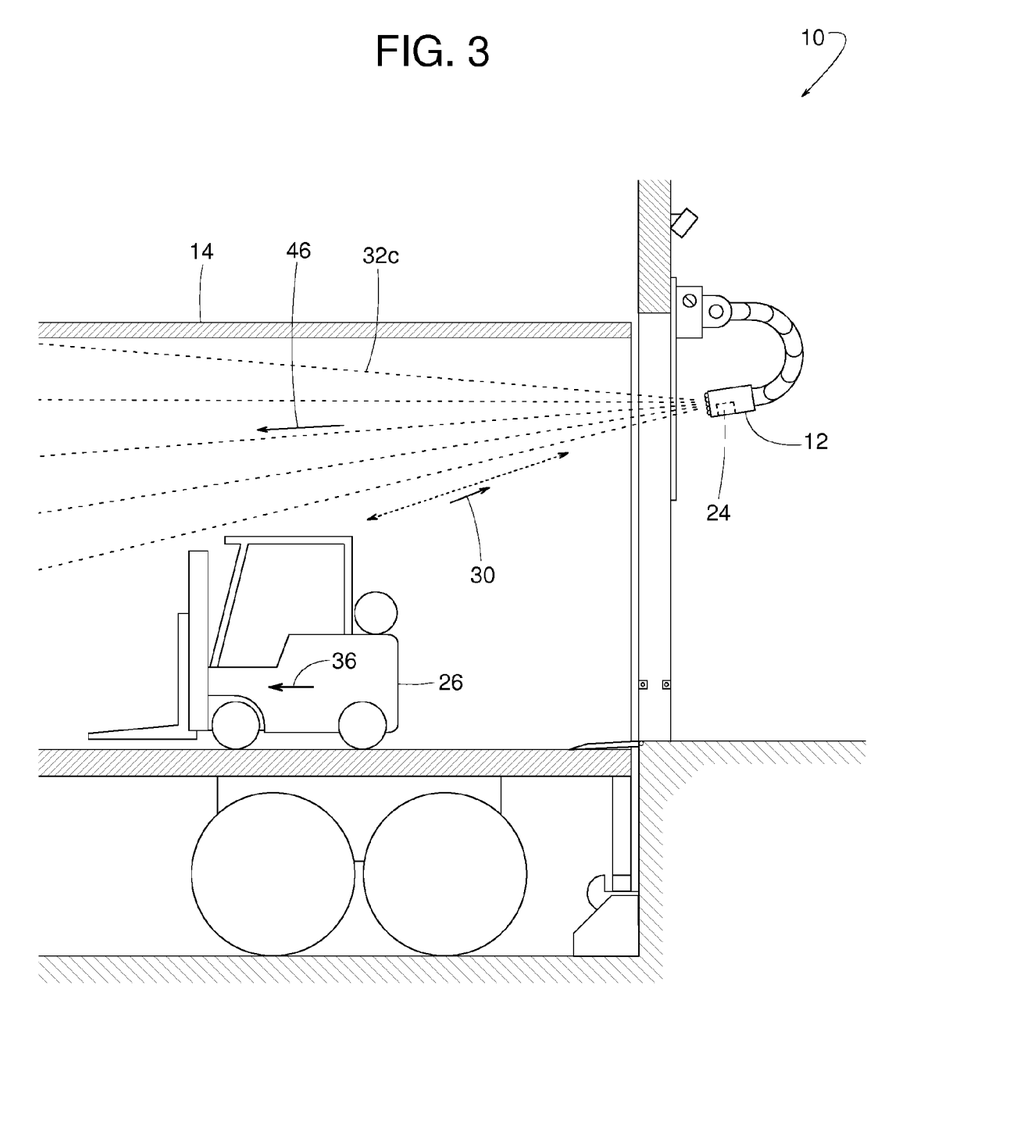
FIG. 3 is a cross-sectional side view similar to FIG. 1 but showing the example lighting system directing the light at a higher angle (high beam).
Figure 4:
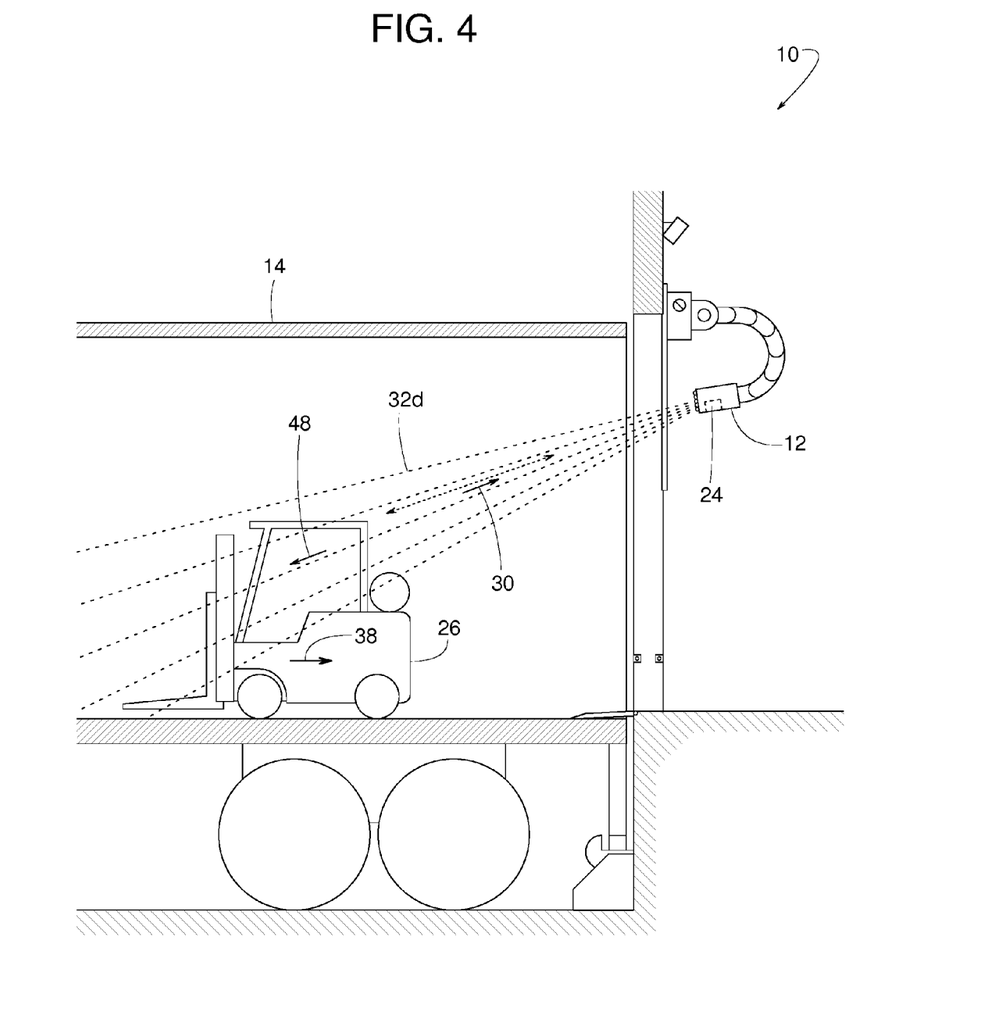
FIG. 4 is a cross-sectional side view similar to FIG. 3 but showing the example lighting system directing the light at a lower angle (low beam).

In the example shown in FIGS. 3 and 4, the lamp 12 projects light output 32c as a high beam in a first direction 46 during the first illuminating mode (FIG. 3) and projects light output 32d as a low beam in a second direction 48 during the second illuminating mode (FIG. 4), wherein the first and second directions 46 and 48 deviate angularly.

Figure 5:
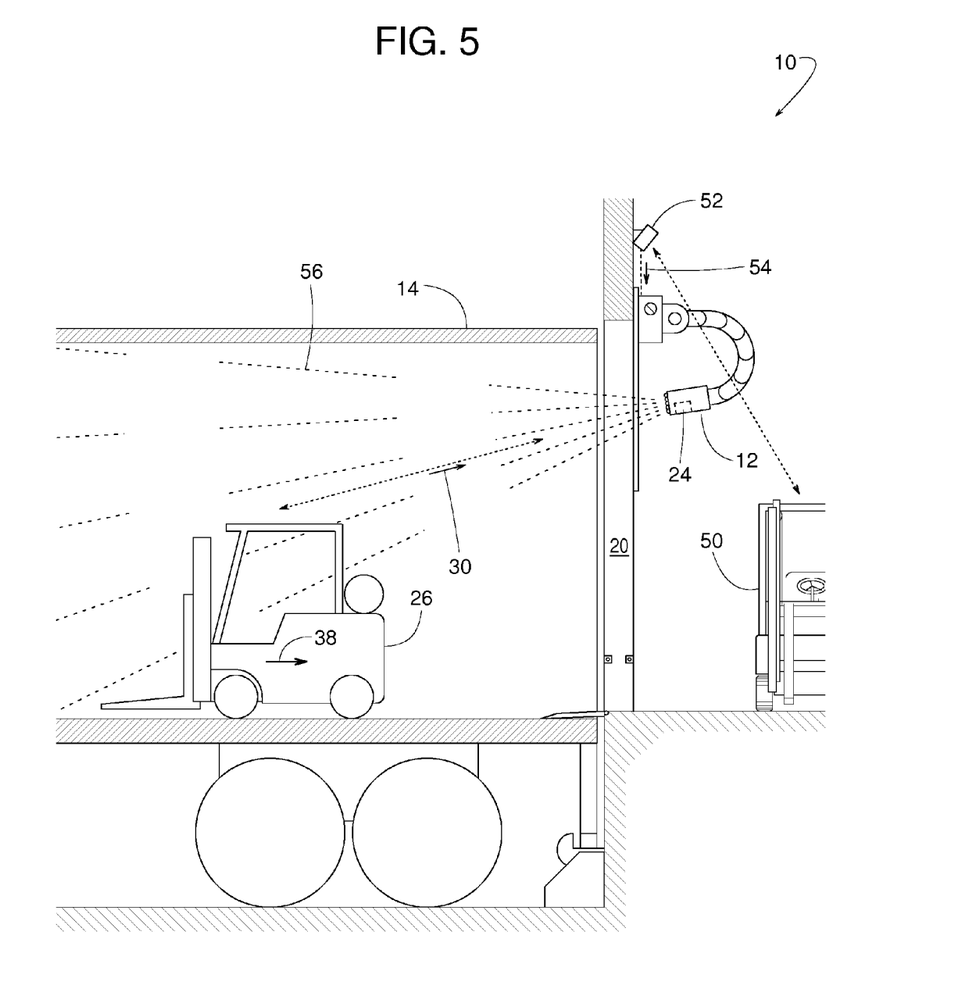
FIG. 5 is a cross-sectional side view similar to FIGS. 2 and 4 but showing the example lighting system projecting a warning light into vehicle 4.

Referring to FIG. 5, to avoid a potential collision between the body 26 exiting the vehicle 14 and a peripheral body 50 beyond the vehicle 14 (e.g., within the building 18), some examples of the motion sensing system 24 include a peripheral body sensor 52 (e.g., passive infrared sensor, ultrasonic sensor, microwave sensor, photoelectric eye, camera with video analytics, etc.). Examples of the peripheral body 50 include, but are not limited to, a person, a material handling device, and a moving or stationary object. The peripheral body sensor 52 provides a warning signal 54 in response to sensing the presence or motion of the peripheral body 50 near the doorway 20. The lamp 12 is operatively connected in signal communication with the peripheral body sensor 52 so as to receive a warning signal 54. In response to receiving the warning signal 54, the controller 32 switches the lamp 12 to a third illuminating mode, as shown in FIG. 5. In the third illuminating mode, the lamp 12 projects a warning light 56 into the vehicle 14. The warning light 56 of the third illuminating mode is distinguishable from the light projected during the first and second illuminating modes. Examples of the warning light 56 include, but are not limited to, a colored light, a flashing light, and a moving light.

Figure 6:
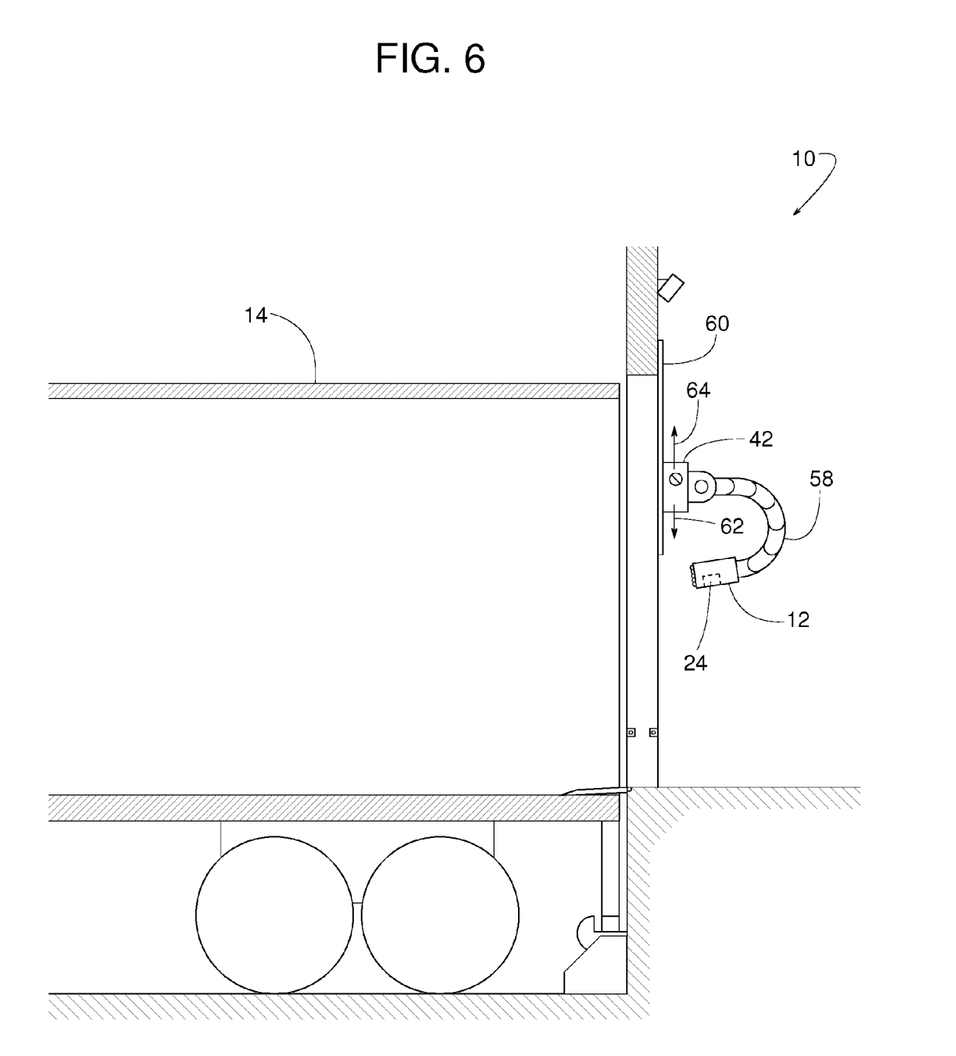
FIG. 6 is a cross-sectional side view similar to FIG. 1 but showing the example lighting system being vertically adjusted.

Referring to FIG. 6, to make it easier to adjust the aim (e.g., direction of light) or other features of the lighting system 10, an articulated arm 58 connects the lamp 12 to the mounting base 42, which in turn is attached to a track 60 which, in the illustrated example, is fixed to the building 18. The base 42 mounted to the track 60 allows one to manually lower 62 the base 42 to where the adjustments can be done more readily. After adjusting the lighting system 10, the person can return 64 the lamp 12 to its normally elevated position on the track 60.

Figure 7:
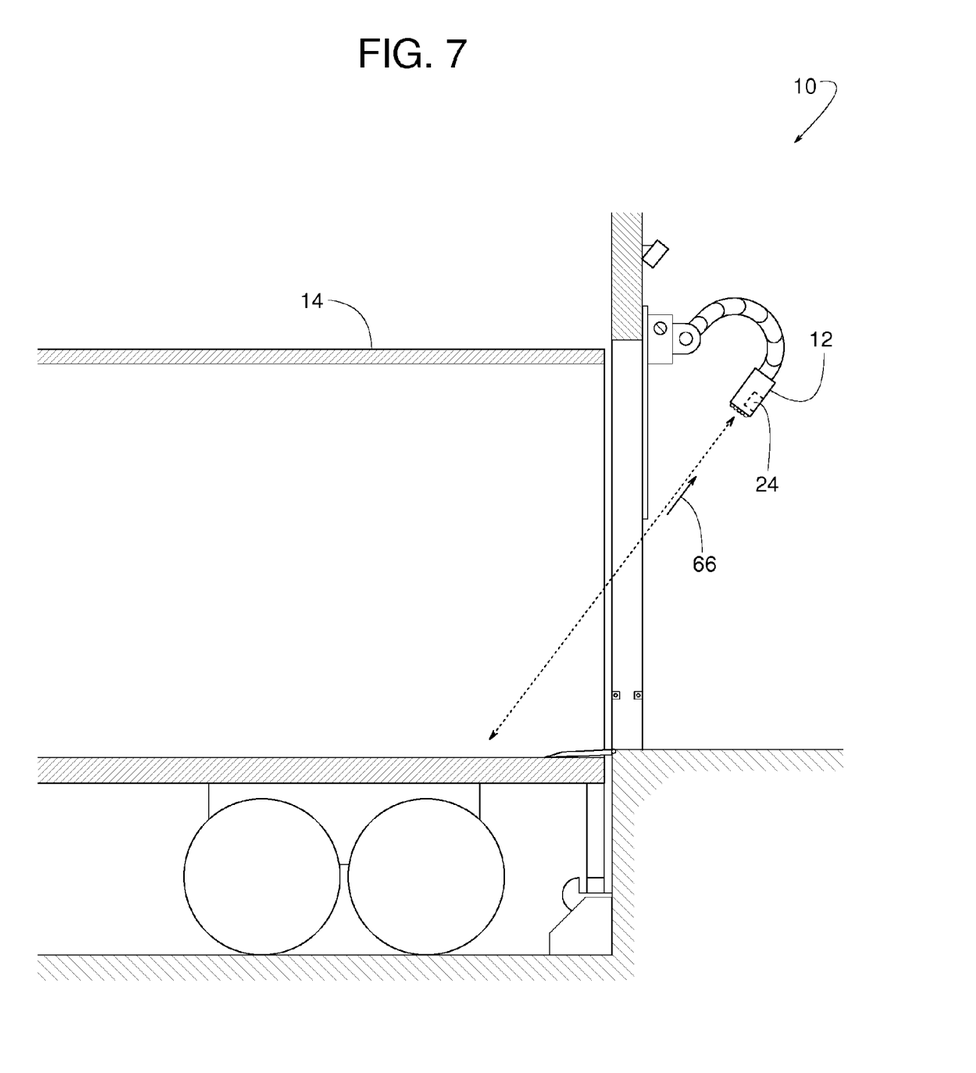
FIG. 7 is a cross-sectional side view similar to FIG. 1 but showing the example lighting system dimming or de-energizing in response to sensing a lack of motion.

In some examples, to save energy, the motion sensing system 24 provides a quiescent signal 66 in response to detecting a lack of motion for a threshold period of time inside the vehicle 14, as shown in FIG. 7. If the motion sensing system 24 fails to detect any appreciable motion over the threshold period of time (e.g., ten minutes), the lamp 12 turns off or provides a reduction of light output in response to the quiescent signal 66.

Referring back to FIG. 1, in addition or alternatively, some examples of the motion sensing system 24 comprise an enter/exit sensor 68 (e.g., two photoelectric eyes projecting two through-beams across the width of the doorway 20) that provides an enter-signal 70 in response to the body 26 (e.g., the material handling device 28) entering the vehicle 14 and providing an exit-signal 72 in response to the body 26 (e.g., the material handling device 28) exiting the vehicle 14. The sequence in which the two beams of the sensor 68 are interrupted indicates the direction in which the body 26 (e.g., the material handling device 28) is passing through the doorway 20. In some examples, the signals 70 and 72 determining that the body 26 has just entered the vehicle 14 triggers the controller 34 to command the lamp 12 to operate in the first illuminating mode. In some examples, the signals 70 and 72 determining that the body 26 has entered the vehicle 14, in combination with detecting a lack of motion in vehicle 14 indicating that the body 26 is about to reverse direction, triggers the controller 34 to command the lamp 12 to switch from the first illuminating mode to the second illuminating mode.

Figure 8:
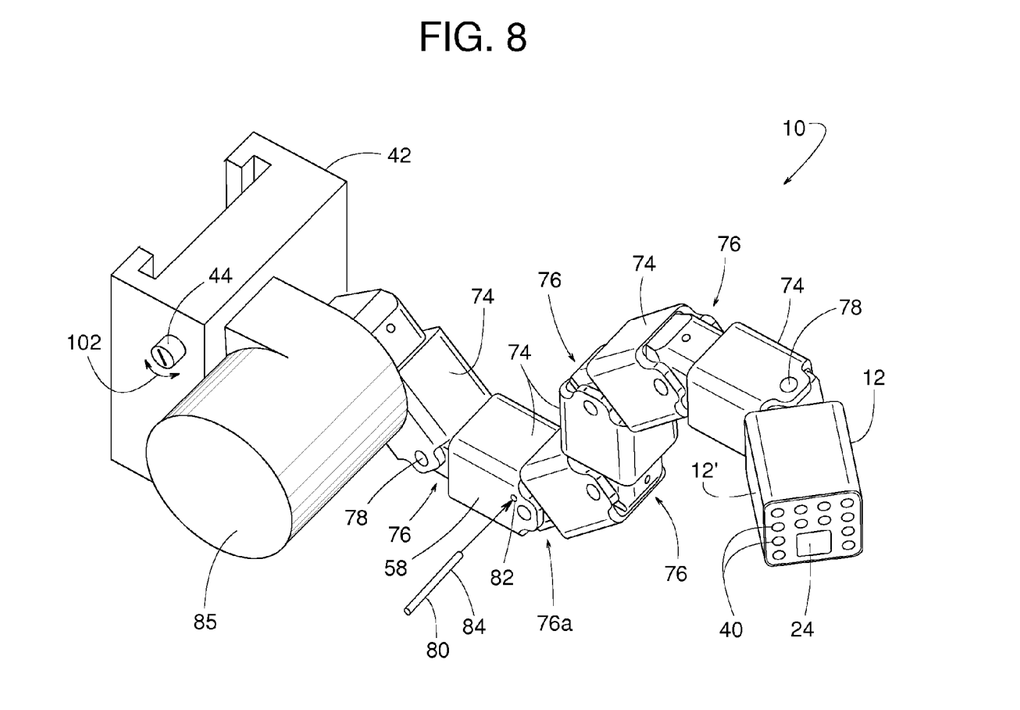
FIG. 8 is a perspective view of various example parts of the example lighting system shown in FIG. 1, wherein the example parts are constructed according to the teachings disclosed herein.
Figure 9:
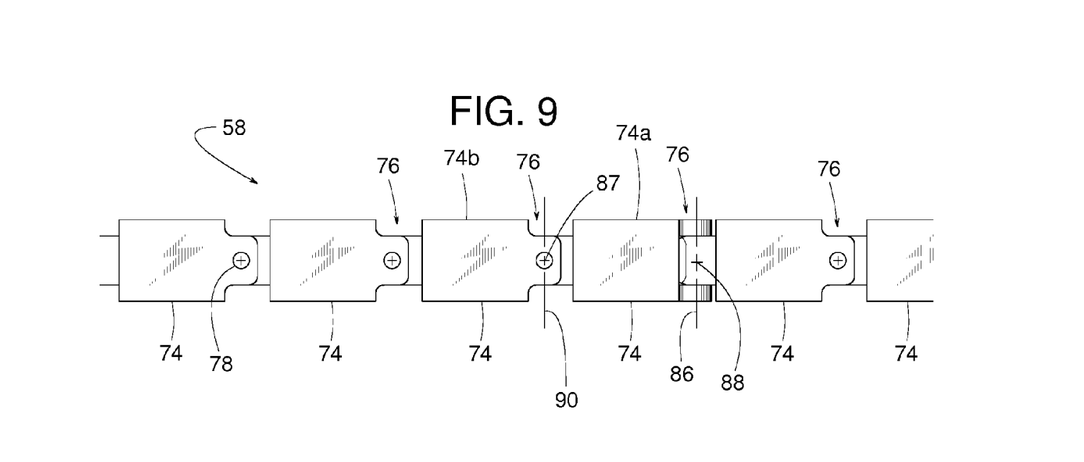
FIG. 9 is a side view of an example lamp-supporting articulated arm constructed according to the teachings disclosed herein.

Referring to FIGS. 8 and 9, in some examples, the articulated arm 58 comprises a plurality of links 74 interconnected via a plurality of pivotal joints 76. In some examples, a fastener 78 (e.g., a screw) with an adjustable degree of tightness provides means for adjusting the degree of tightness of the plurality of pivotal joints 76.

In some examples, a locking element 80 (e.g., a pin or screw) can be installed to lock a chosen joint 76a at a desired angle. FIG. 8 shows the locking element 80 movable selectively to an installed position 82 for inhibiting the joint 76a from pivoting and a removed position 84 for providing the joint 76a with pivotal freedom.

In some examples, the lighting system 10 includes a powered actuator 85 connected to move the lamp 12 and the articulated arm 58 selectively between a stored position (e.g., FIG. 7) and a deployed position (e.g., FIGS. 1-5). This provides the option of storing the lamp 12 at a position where it does not obstruct the doorway 20 nor interfere with the operation of a door at the doorway 20. In some examples, the powered actuator 85 is operated automatically with the actuation of the door. For example, the lamp 12 moves to the stored position when the door starts closing and moves to the deployed position when the door is fully open. Examples of the powered actuator 85 include, but are not limited to, an electric motor, a hydraulic motor, a pneumatic motor, a linear motor, a solenoid, a gear motor, and a hydraulic or pneumatic cylinder.

In some examples, the articulated arm 58 can be assembled in different configurations to define the arm's direction of pivotal freedom at each joint. FIG. 9, for instance, shows a first link 74a rotated approximately ninety degrees relative to all the other links 74, including a second link 74b. The first link 74a is pivotal about a first axis 86, and the second link 74b is pivotal about a second axis 87. The first axis 86 is substantially perpendicular to the second axis 87. The first link 74a is inhibited from pivoting about a third axis 88 that is perpendicular to and intersecting the first axis 86. The second link 74b is inhibited from pivoting about a fourth axis 90 that is perpendicular to and intersecting the second axis 87.

Figure 10:
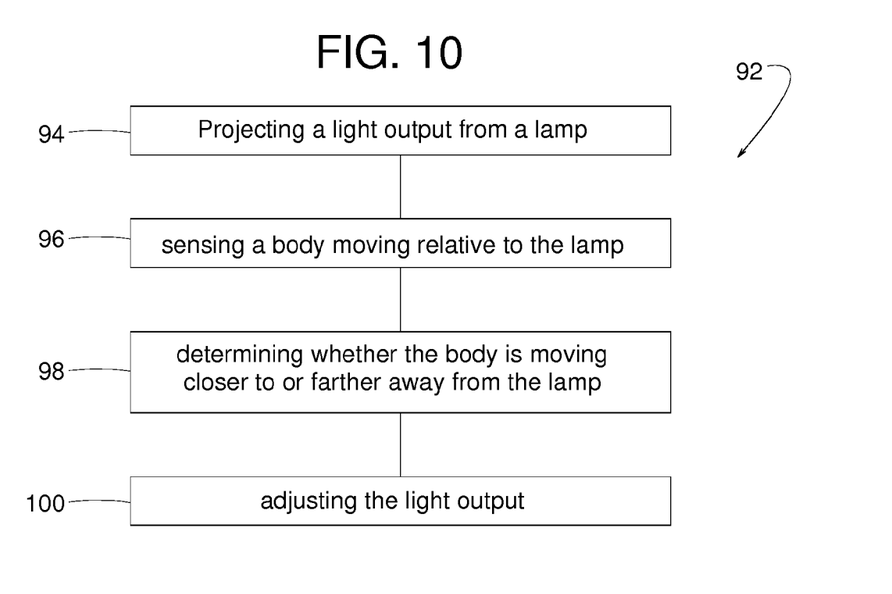
FIG. 10 is a block diagram illustrating example methods associated with the example lighting system shown in FIG. 1.

An example lighting system method pertaining to the lighting system 10 is illustrated by a block diagram 92 shown in FIG. 10. Block 94 represents projecting the light output 32 from the lamp 12. Block 96 represents sensing the body 26 moving relative to the lamp 12. Block 98 represents determining whether the body 26 is moving closer to or farther away from the lamp 12. Block 100 represents adjusting the light output 32. FIGS. 1-4 illustrate adjusting light output over a chosen range or delta of brightness. In some examples, the chosen range includes the range going from, but are not limited to, high to low beam, bright to dim, etc. Arrow 102 of FIG. 8 represents adjusting the chosen range.

Figure 11:
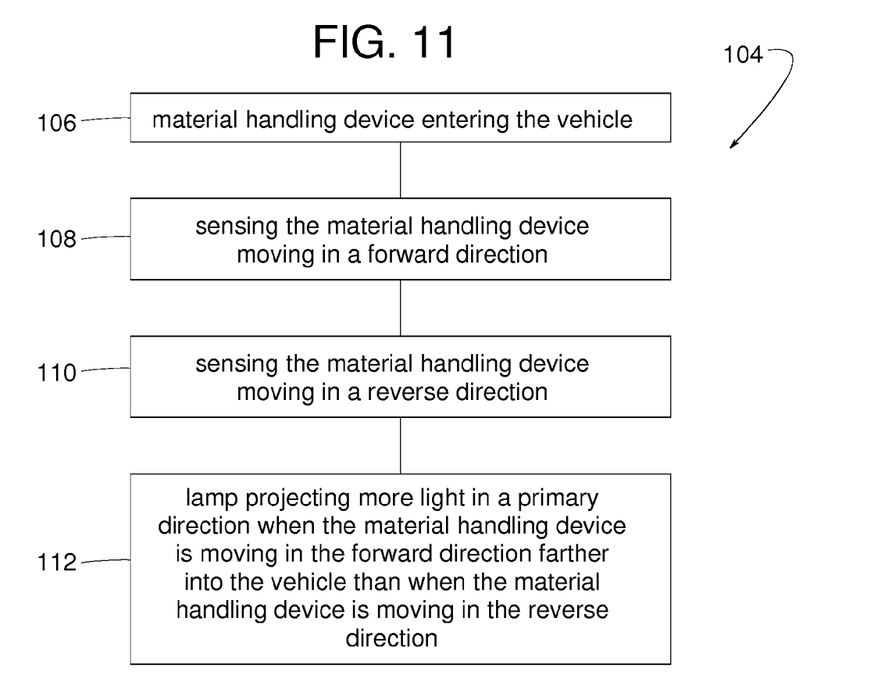
FIG. 11 is another block diagram illustrating other example methods associated with the example lighting system shown in FIG. 1.

Another example lighting system method pertaining to lighting system 10 is illustrated by a block diagram 104 shown in FIG. 11. Block 106 represents the body 26 (e.g., the material handling device 28) entering the vehicle 14. Block 108 represents sensing the body 26 (e.g., the material handling device 28) moving in the forward direction 36 farther into the vehicle 14. Block 110 represents sensing the body 26 (e.g., the material handling device 28) moving in the reverse direction 38. Block 112 represents the lamp 12 projecting more light in a primary direction 114 when the body 26 (e.g., the material handling device 28) is moving in the forward direction 36 farther into the vehicle 14 than when the body 26 (e.g., the material handling device 28) is moving in the reverse direction 38.

Example lighting systems disclosed herein for use at a loading dock where a material handling device is used to load or unload a vehicle parked at the loading dock include a motion sensing system to be spaced apart from the material handling device. The motion sensing system of some examples is to provide an operation signal in response to the material handling device undergoing a change in travel direction within the vehicle. Some example lighting systems also include a lamp to be operatively connected in signal communication with the motion sensing system so as to receive the operation signal from the motion sensing system. In some such examples, the lamp has a first illuminating mode and a second illuminating mode, and the lamp is to switch between the first illuminating mode and the second illuminating mode in response to the operation signal.

In some examples, the change in travel direction pertains to the material handling device moving in a first direction farther into the vehicle and a second direction opposite the first direction. In some examples, the lamp is to project more light when the lamp is in the first illuminating mode than when the lamp is in the second illuminating mode. In some examples, the lamp includes a plurality of light-emitting elements. In some such examples, a greater number of the plurality of light-emitting elements are to emit light when the lamp is in the first illuminating mode than when the lamp is in the second illuminating mode. In some examples, the lamp, in the first illuminating mode, is to project light in a first direction and the lamp, in the second illuminating mode, is to project light in a second direction, the first direction being different from the second direction.

In some examples, the lighting system further includes a user adjustment input associated with the lamp. The user adjustment input in some such examples is to facilitate changing a brightness of the first illuminating mode and correspondingly changing a brightness of the second illuminating mode. In some examples, the motion sensing system includes an enter/exit sensor to provide an enter-signal in response to the material handling device entering the vehicle and to provide an exit-signal in response to the material handling device exiting the vehicle. In some examples, the motion sensing system is to provide a signal in response to the motion sensing system detecting a lack of motion over a threshold time period. In some such examples, the lamp is to reduce a light output in response to the signal. In some examples, the motion sensing system is to include a peripheral body sensor positioned to sense a peripheral body beyond the vehicle. The peripheral body sensor in such examples is to provide a warning signal in response to sensing the peripheral body beyond the vehicle. In some such examples, the lamp is to be in signal communication with the peripheral body sensor so as to receive the warning signal from the peripheral body sensor. In some examples, the lamp has a third illuminating mode distinguishable from the first illuminating mode and the second illuminating mode, and the lamp to switch to the third illuminating mode in response to the warning signal.

In some examples, the lighting system further includes an articulated arm to support the lamp. In some such examples, the articulated arm includes a plurality of links interconnected via a plurality of pivotal joints. Some example lighting systems also include a lock having an installed position and a removed position. In such examples, the lock in the removed position is to be spaced apart from the articulated arm and is to provide a first joint of the plurality of pivotal joints with pivotal freedom. In such examples, the lock in the installed position is to engage the articulated arm and is to inhibit pivotal motion of the first joint. In some examples, the lighting system further includes an articulated arm to support the lamp. The articulated arm includes a plurality of links interconnected via a plurality of pivotal joints. In some examples, the pivotal joints have an adjustable degree of tightness. The lighting system in some examples further includes fasteners at corresponding pivotal joints of the plurality of pivotal joints, the fastener to determine the degree of tightness of corresponding ones of the pivotal joints. In some examples, the lighting system further includes an articulated arm to support the lamp, the articulated arm including a plurality of links interconnected via a plurality of pivotal joints. In some such examples, the plurality of links includes a first link pivotal about a first axis and a second link pivotal about a second axis. The first axis of some examples is substantially perpendicular to the second axis. In some such examples, the first link is inhibited from pivoting about a third axis perpendicular to and intersecting the first axis and the second link is inhibited from pivoting about a fourth axis perpendicular to and intersecting the second axis.

In some examples, the lighting system includes a track to be fixed to a wall of the loading dock and a base to be mounted to the track and vertically movable relative to the track. In some such examples, the lighting system also includes an articulated arm to couple the lamp to the base. In some examples, the articulated arm includes a plurality of links interconnected via a plurality of pivotal joints. In some examples, the lighting system includes an articulated arm to support the lamp. The articulated arm in some such examples includes a plurality of links interconnected via a plurality of pivotal joints. In some such examples, the lighting system also includes a powered actuator to be coupled to the articulated arm. In some examples, the lamp and the articulated arm are to be selectively movable by the powered actuator to a stored position and a deployed position. In some examples, the lamp includes a housing containing both a light-emitting element and the motion sensing system.

Some example methods include projecting a light output from a lamp. Some example methods further include sensing a body moving relative to the lamp. Some example methods further include determining whether the body is moving closer to or farther away from the lamp. Some example methods also include adjusting the light output depending on whether the body is moving closer to or farther away from the lamp. Some such examples further include projecting more light when the body is moving farther away from the lamp than when the body is moving closer to the lamp. Some example methods also include aiming the light output higher when the body is moving farther away from the lamp than when the body is moving closer to the lamp. In some examples, the disclosed methods also include adjusting the light output over a chosen range; and adjusting the chosen range. Some example methods include sensing a lack of movement over a threshold period of time. In some such examples, the methods further include projecting more light when the body is moving farther away from the lamp than when the body is moving closer to the lamp. Some such example methods also include projecting more light when the body is moving closer to the lamp than when there is the lack of movement after the threshold period of time. Some example methods include projecting the light output into a vehicle. Some example methods further include sensing a peripheral body beyond the vehicle. In some such example methods also include, in response to sensing the peripheral body beyond the vehicle, projecting a warning light into the vehicle.

Other example methods for use at a loading dock where a material handling device is used for transporting cargo relative to a vehicle parked at the loading dock include sensing the material handling device moving in a first direction farther into the vehicle. Some example methods further include sensing the material handling device moving in a second direction opposite the first direction. Some example methods further include projecting a light output from a lamp into the vehicle. In some examples, the lamp is spaced apart from the vehicle. In some examples, the lamp projects more light when the material handling device is moving in the first direction than when the material handling device is moving in the second direction.

Some example methods further include aiming the light output higher when the material handling device is moving farther away from the lamp than when the material handling device is moving closer to the lamp. Some example methods further include sensing a lack of movement over a threshold period. Some example methods further include projecting more light when the material handling device is moving farther away from the lamp than when the material handling device is moving closer to the lamp. Some example methods further include projecting more light when the material handling device is moving closer to the lamp than when there is the lack of movement after the threshold period. Some example methods further include sensing a peripheral body beyond the vehicle. Some such example methods also include projecting a warning light into the vehicle.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. A lighting system for use at a loading dock where a material handling device is used to load or unload a vehicle parked at the loading dock, the lighting system comprising:
   a motion sensing system to be spaced apart from the material handling device, the motion sensing system to provide an operation signal in response to the material handling device undergoing a change in travel direction within the vehicle; and
   a lamp to be operatively connected in signal communication with the motion sensing system so as to receive the operation signal from the motion sensing system, the lamp having a first illuminating mode and a second illuminating mode, and the lamp to switch between the first illuminating mode and the second illuminating mode in response to the operation signal, the lamp projecting more light when the lamp is in the first illuminating mode than when the lamp is in the second illuminating mode, the lamp projecting more light when the lamp is in the second illuminating mode than when the lamp is off, the lamp including a housing containing both a light-emitting element and the motion sensing system.

2. The lighting system of claim 1, wherein the change in travel direction pertains to the material handling device moving in a first direction farther into the vehicle and a second direction opposite the first direction.

3. The lighting system of claim 1, wherein the lamp includes a plurality of light-emitting elements, a greater number of the plurality of light-emitting elements to emit light when the lamp is in the first illuminating mode than when the lamp is in the second illuminating mode.

4. A lighting system for use at a loading dock where a material handling device is used to load or unload a vehicle parked at the loading dock, the lighting system comprising:
   a motion sensing system to be spaced apart from the material handling device, the motion sensing system to provide an operation signal in response to the material handling device undergoing a change in travel direction within the vehicle; and
   a lamp to be operatively connected in signal communication with the motion sensing system so as to receive the operation signal from the motion sensing system, the lamp having a first illuminating mode and a second illuminating mode, and the lamp to switch between the first illuminating mode and the second illuminating mode in response to the operation signal, wherein the lamp, in the first illuminating mode, is to project light in a first direction and the lamp, in the second illuminating mode, is to project light in a second direction, the first direction being different from the second direction.

5. The lighting system of claim 1 further including a user adjustment input associated with the lamp, the user adjustment input to facilitate changing a brightness of the first illuminating mode and correspondingly changing a brightness of the second illuminating mode.

6. The lighting system of claim 1, wherein the motion sensing system includes an enter/exit sensor to provide an enter-signal in response to the material handling device entering the vehicle and to provide an exit-signal in response to the material handling device exiting the vehicle.

7. The lighting system of claim 1, wherein the motion sensing system is to provide a signal in response to the motion sensing system detecting a lack of motion over a threshold time period, the lamp to reduce a light output in response to the signal.

8. The lighting system of claim 1, wherein the motion sensing system is to include a peripheral body sensor positioned to sense a peripheral body beyond the vehicle, the peripheral body sensor to provide a warning signal in response to sensing the peripheral body beyond the vehicle, the lamp to be in signal communication with the peripheral body sensor so as to receive the warning signal from the peripheral body sensor, the lamp having a third illuminating mode distinguishable from the first illuminating mode and the second illuminating mode, and the lamp to switch to the third illuminating mode in response to the warning signal.

9. A lighting system for use at a loading dock where a material handling device is used to load or unload a vehicle parked at the loading dock, the lighting system comprising:
   a motion sensing system to be spaced apart from the material handling device, the motion sensing system to provide an operation signal in response to the material handling device undergoing a change in travel direction within the vehicle;
   a lamp to be operatively connected in signal communication with the motion sensing system so as to receive the operation signal from the motion sensing system, the lamp having a first illuminating mode and a second illuminating mode, and the lamp to switch between the first illuminating mode and the second illuminating mode in response to the operation signal;
   an articulated arm to support the lamp, the articulated arm including a plurality of links interconnected via a plurality of pivotal joints, the pivotal joints having an adjustable degree of tightness; and
   fasteners at corresponding pivotal joints of the plurality of pivotal joints, the fasteners to determine the degree of tightness of corresponding ones of the pivotal joints.

10. The lighting system of claim 9, further including
   a lock having an installed position and a removed position, the lock in the removed position to be spaced apart from the articulated arm and to provide a first joint of the plurality of pivotal joints with pivotal freedom, the lock in the installed position to engage the articulated arm and to inhibit pivotal motion of the first joint.

11. A lighting system for use at a loading dock where a material handling device is used to load or unload a vehicle parked at the loading dock, the lighting system comprising:
a motion sensing system to be spaced apart from the material handling device, the motion sensing system to provide an operation signal in response to the material handling device undergoing a change in travel direction within the vehicle;
a lamp to be operatively connected in signal communication with the motion sensing system so as to receive the operation signal from the motion sensing system, the lamp having a first illuminating mode and a second illuminating mode, and the lamp to switch between the first illuminating mode and the second illuminating mode in response to the operation signal; and
an articulated arm to support the lamp, the articulated arm including a plurality of links interconnected via a plurality of pivotal joints, the plurality of links includes a first link pivotal about a first axis and a second link pivotal about a second axis, the first axis being substantially perpendicular to the second axis, the first link being inhibited from pivoting about a third axis perpendicular to and intersecting the first axis, the second link being inhibited from pivoting about a fourth axis perpendicular to and intersecting the second axis.

12. A lighting system for use at a loading dock where a material handling device is used to load or unload a vehicle parked at the loading dock, the lighting system comprising:
a motion sensing system to be spaced apart from the material handling device, the motion sensing system to provide an operation signal in response to the material handling device undergoing a change in travel direction within the vehicle;
a lamp to be operatively connected in signal communication with the motion sensing system so as to receive the operation signal from the motion sensing system, the lamp having a first illuminating mode and a second illuminating mode, and the lamp to switch between the first illuminating mode and the second illuminating mode in response to the operation signal;
a track to be fixed to a wall of the loading dock;
a base to be mounted to the track and vertically movable relative to the track; and
an articulated arm to couple the lamp to the base, the articulated arm including a plurality of links interconnected via a plurality of pivotal joints.

13. The lighting system of claim 12, further including a powered actuator to be coupled to the articulated arm, the lamp and the articulated arm to be selectively movable by the powered actuator to a stored position and a deployed position.

14. The lighting system of claim 1, further comprising an articulated arm to support the lamp, the articulated arm including a plurality of links interconnected via a plurality of pivotal joints.

15. A lighting system method, comprising:
projecting a light output from a lamp;
sensing a body moving relative to the lamp;
determining whether the body is moving closer to or farther away from the lamp;
adjusting the light output depending on whether the body is moving closer to or farther away from the lamp; and
aiming the light output higher when the body is moving farther away from the lamp than when the body is moving closer to the lamp.

16. The lighting system method of claim 15, further including projecting more light when the body is moving farther away from the lamp than when the body is moving closer to the lamp.

17. The lighting system method of claim 15, further including:
adjusting the light output over a chosen range; and
adjusting the chosen range.

18. The lighting system method of claim 15, further including:
sensing a lack of movement over a threshold period of time;
projecting more light when the body is moving farther away from the lamp than when the body is moving closer to the lamp; and
projecting more light when the body is moving closer to the lamp than when there is the lack of movement after the threshold period of time.

19. The lighting system method of claim 15, further including:
projecting the light output into a vehicle;
sensing a peripheral body beyond the vehicle; and
in response to sensing the peripheral body beyond the vehicle, projecting a warning light into the vehicle.

20. A lighting system method for use at a loading dock where a material handling device is used for transporting cargo relative to a vehicle parked at the loading dock, the lighting system method comprising:
sensing the material handling device moving in a first direction farther into the vehicle;
sensing the material handling device moving in a second direction opposite the first direction; and
projecting a light output from a lamp into the vehicle, the lamp being spaced apart from the vehicle, the lamp projecting more light when the material handling device is moving in the first direction than when the material handling device is moving in the second direction; and
aiming the light output higher when the material handling device is moving farther away from the lamp than when the material handling device is moving closer to the lamp.

21. The lighting system method of claim 20, further including:
sensing a lack of movement over a threshold period;
projecting more light when the material handling device is moving farther away from the lamp than when the material handling device is moving closer to the lamp; and
projecting more light when the material handling device is moving closer to the lamp than when there is the lack of movement after the threshold period.

22. The lighting system method of claim 20, further including:
sensing a peripheral body beyond the vehicle; and
projecting a warning light into the vehicle.

* * * * *